United States Patent
Kyoung et al.

(10) Patent No.: US 6,952,389 B2
(45) Date of Patent: Oct. 4, 2005

(54) OPTICAL PICKUP DEVICE

(75) Inventors: Chon-Su Kyoung, Seoul (KR); Seung-Man Oh, Suwon-si (KR); Ho-Seop Jeong, Sungnam-si (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 588 days.

(21) Appl. No.: 10/157,861

(22) Filed: May 31, 2002

(65) Prior Publication Data

US 2003/0179681 A1 Sep. 25, 2003

(30) Foreign Application Priority Data

Mar. 22, 2002 (KR) ........................................ 2002-15664

(51) Int. Cl.[7] .............................................. G11B 7/00
(52) U.S. Cl. .............................. 369/112.07; 269/112.12; 269/112.15
(58) Field of Search ........................ 369/112.03, 112.05, 369/112.07, 112.1, 112.12, 112.15, 44.12, 44.37

(56) References Cited

U.S. PATENT DOCUMENTS

| | | | | |
|---|---|---|---|---|
| 6,072,579 A | * | 6/2000 | Funato | 369/112.15 |
| 6,272,098 B1 | * | 8/2001 | Takahashi et al. | 369/112.17 |
| 6,560,188 B1 | * | 5/2003 | Kyoya et al. | 369/112.03 |

* cited by examiner

Primary Examiner—Thang V Tran
(74) Attorney, Agent, or Firm—Morgan, Lewis & Bockius LLP (57) ABSTRACT

Disclosed herein is an optical pickup device. The optical pickup device has a lead frame package and a detecting unit. The lead frame package has a lead frame, a two-wavelength light source module and a hologram optical element. The lead frame has an opening formed to communicate with the outside. The two-wavelength light source module is arranged in a portion of the opening for emitting two beams having different wavelengths toward an optical disc. The hologram optical element is arranged over the two-wavelength light source module. Further, the hologram optical element includes a hologram pattern formed in its top and a wavefront-compensation hologram pattern formed on its bottom. The detecting unit has a board arranged beneath the lead frame package to be separated from and moved independently of the lead frame package, and a photo detector mounted on said board.

22 Claims, 7 Drawing Sheets

Fig. 1

PRIOR ART

POSITION OF BEAM ON TRACK OF DISC

INTERFERENCE PATTERN OF BEAM ON PD FOR THREE CASES

BEAM ON 3-DIVISION PD

Fig. 10

OPTICAL PICKUP DEVICE

BACKGROUND OF THE INVENTION

1. Field of the Invention

The present invention relates generally to optical pickup devices, and more particularly to an optical pickup device, which achieves miniaturization and slimness of an optical pickup device by using a two-wavelength light source module and a hologram, and reduces the cost of the optical pickup device by continuing to use a conventional photo detector.

2. Description of the Prior Art

Figure 1:
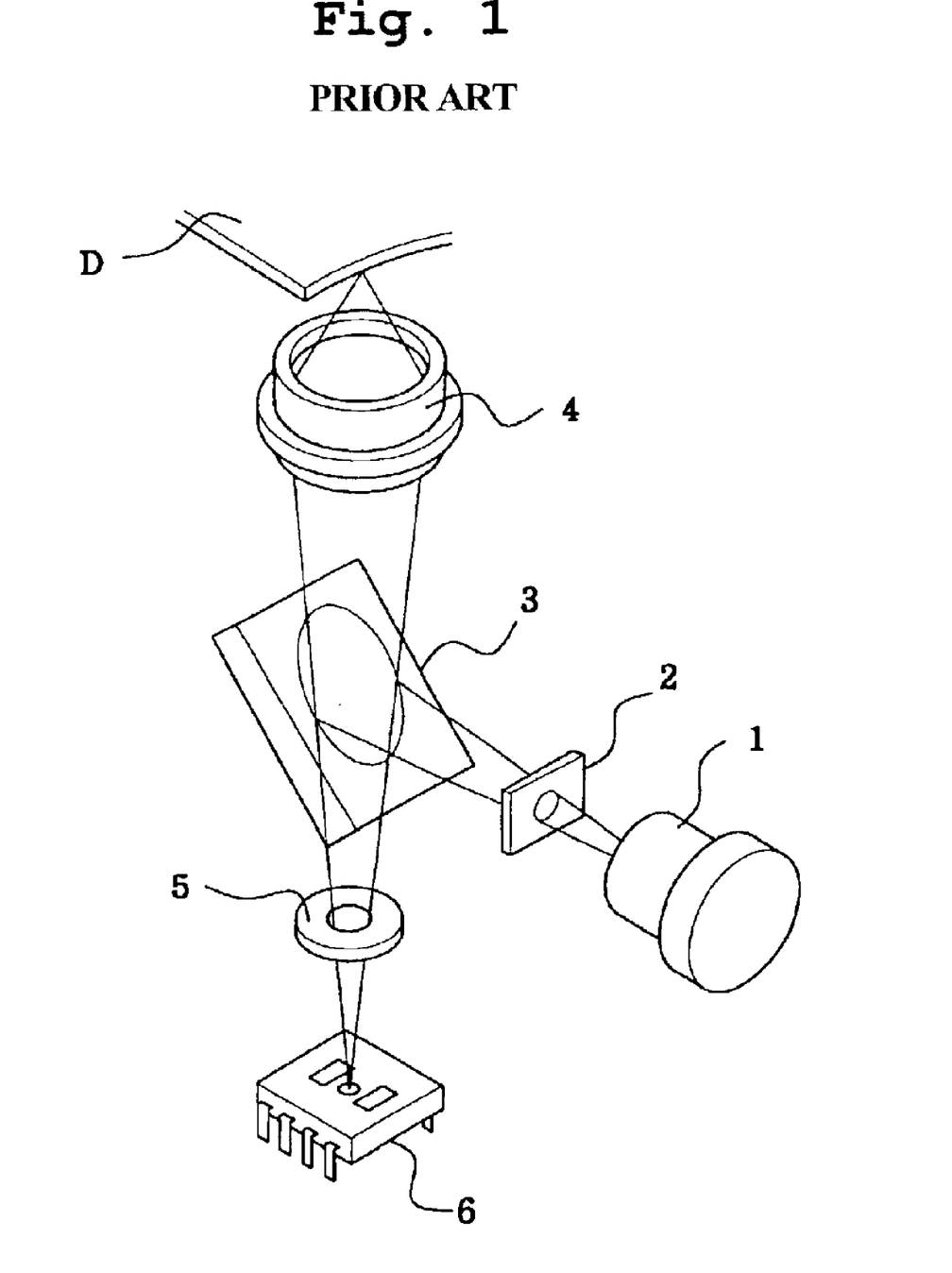
FIG. 1 is a perspective view of a conventional optical pickup device.

Generally, an optical pickup device reproduces signals recorded in various optical discs or records signals in optical discs. Recently, compact disc (CD)/digital versatile disc (DVD)-compatible pickups have become popular. FIG. 1 shows the construction of a conventional optical pickup device using a two-wavelength light source module.

Referring to FIG. 1, the conventional optical pickup device comprises a two-wavelength light source module 1, a diffraction grating 2, a beam splitter 3, an object lens 4, a sensor lens 5 and a photo detector 6. The two-wavelength light source module 1 generates two beams with wavelengths of 650 nm for a DVD and 780 nm for a CD, respectively. The diffraction grating 2 divides each beam emitted from the two-wavelength light source module 1 into at least three beams such as 0th, +1th, and −1th diffraction order beams. The beam splitter 3 causes inputted beams to be reflected toward an optical disc D. The object lens 4 condenses beams onto a track of the optical disc. The sensor lens 5 concentrates passing beams when beams reflected from the optical disc D pass through the beam splitter 3. The photo detector 6 detects the beams concentrated by the sensor lens 5 and converts the beams into electrical signals.

In the optical pickup device with the above construction, each beam emitted from the two-wavelength light source module 1 is condensed onto a single point on the optical disc D through the diffraction grating 2, the beam splitter 3 and the object lens 4, while each beam reflected from the optical disc D is detected by the photo detector 6 through the object lens 4, the beam splitter 3 and the sensor lens 5.

However, in such a conventional optical pickup device, the positions of beams arriving at the photo detector 6 are spaced apart from each other in proportion to oscillation intervals of beams emitted from the two-wavelength light source module 1. Therefore, a new photo detector having patterns, which are spaced apart from each other in proportion to the oscillation intervals, must be developed and used, instead of a conventional photo detector now being widely used. Moreover, the cost of the optical pickup device is high due to developing costs of the new photo detector.

Further, the conventional optical pickup device is problematic in that it requires many installation processes due to a great number of optical parts, it is difficult to achieve slimness and miniaturization of the optical pickup device, and the manufacturing cost is increased due to its complicated construction.

Therefore, there is recently proposed an optical pickup device using a hologram so as to simplify the construction of the conventional optical pickup device and reduce the number of optical parts constituting the optical pickup device.

Figure 2:
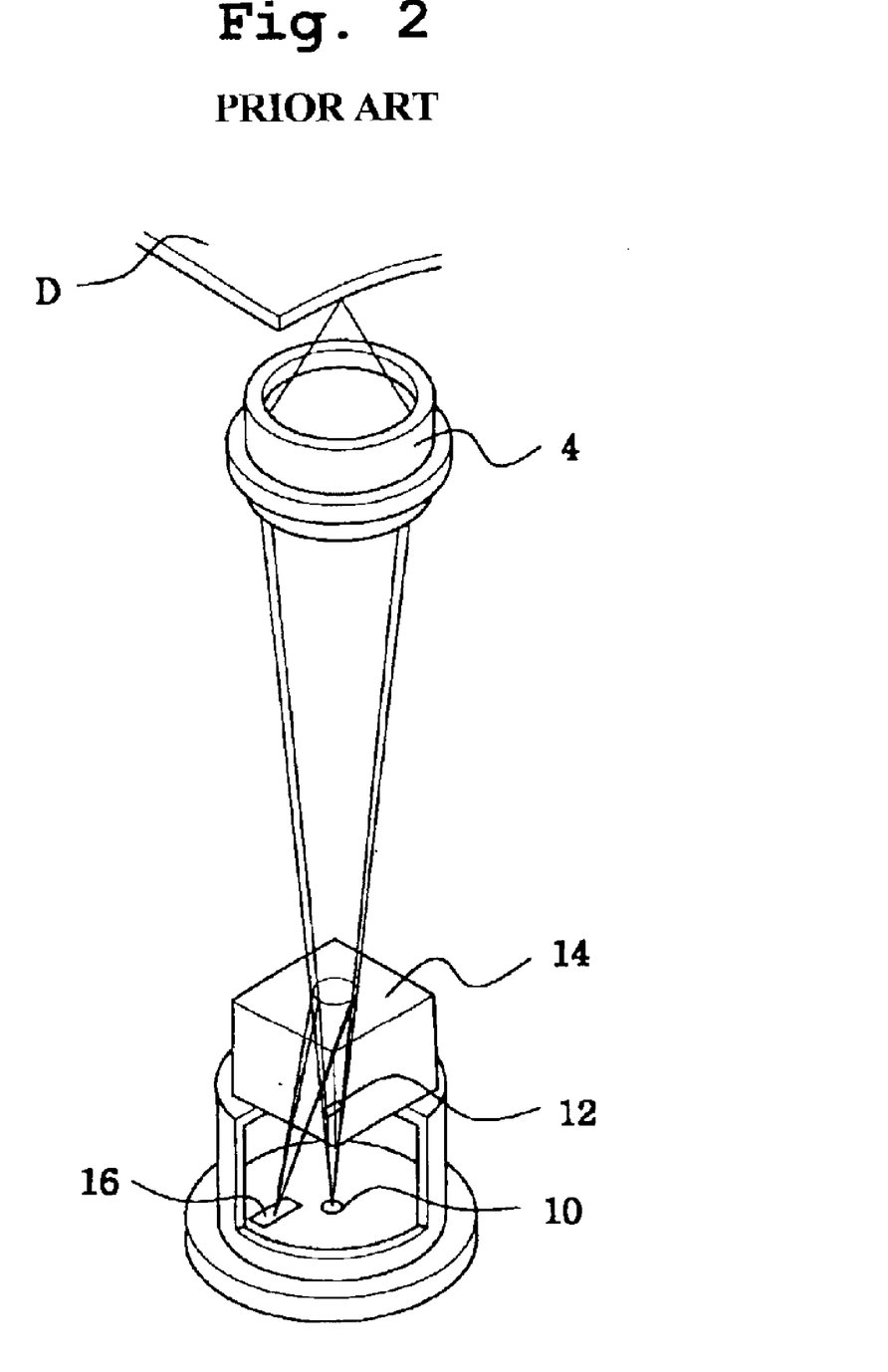
FIG. 2 is a perspective view of a conventional optical pickup device using a hologram.

FIG. 2 shows a conventional optical pickup device using a hologram. Referring to FIG. 2, the optical pickup device using a hologram comprises a two-wavelength light source module 10 to emit beams, a diffraction grating 12 to divide each beam into three beams, a hologram optical element 14 to receive three beams reflected from an optical disc D and diffract the beams, and a photo detector 16 to receive beams which are diffracted and condensed while passing through the hologram optical element 14. Both the two-wavelength light source module 10 and the photo detector 16 are fixed to a single common board by means of die boding. The diffraction grating 12, the hologram optical element 14, the two-wavelength light source module 10 and the photo detector 16 mounted on the single common board are integrated into a single package. Naturally, an object lens 4 to condense beams onto a single point on the optical disc D is disposed between the hologram optical element 14 and the optical disc D.

In the optical pickup device constructed as described above, each beam emitted from the two-wavelength light source module 10 is divided into three beams by the diffraction grating 12. The three divided beams are condensed by the object lens 4 to be irradiated onto the surface of the optical disc D. The beams irradiated onto the surface of the optical disc D are reflected, and the reflected beams are diffracted by the hologram optical element 14, and are then detected by the photo detector 16.

As described above, in the optical pickup device using a hologram, the beams diffracted by the hologram optical element are detected by the photo detector, thus eliminating both a beam splitter and a sensor lens, and consequently reducing the number of optical parts. Further, the two-wavelength light source module, the photo detector, the diffraction grating and the hologram optical element are integrated into a single package, thereby simplifying the construction of the optical pickup device and reducing the manufacturing costs thereof.

However, in the conventional, hologram optical pickup device, it is necessary to arrange the photo detector in an exact position because tolerance between the optical source module and the photo detector greatly affects the performance of the photo detector which detects beams emitted from the light source module. In this case, the conventional hologram optical pickup device is disadvantageous in that the operation of precisely arranging both the light source module and the photo detector is complicated, and it requires expensive equipment of great precision. Further, the conventional hologram optical pickup device is disadvantageous in that it is impossible to adjust the position of the photo detector after the photo detector is once fixed.

Meanwhile, in the hologram optical pickup device, the hologram must be divided into two pieces so as to diffract two beams of different wavelengths to be condensed onto a single point of the photo detector. In this case, the hologram optical pickup device is problematic in that when the hologram is divided into several pieces in order to obtain a required signal, dispersion noise of beams arriving at the hologram is created, thus decreasing optical efficiency.

SUMMARY OF THE INVENTION

Accordingly, the present invention has been made keeping in mind the above problems occurring in the prior art, and an object of the present invention is to provide an optical pickup device, which can reduce the number of optical parts by using a hologram, save the cost of the optical pickup device by continuing to use a conventional photo detector, and achieve the miniaturization and slimness of an optical pickup device by integrating optical parts into a single module.

Another object of the present invention is to provide an optical pickup device, which can easily and precisely adjust the position of a photo detector without the use of expensive equipment.

A further object of the present invention is to provide an optical pickup device, which can improve optical efficiency by preventing dispersion noise from being generated by each beam passing through a hologram.

In order to accomplish the above object, the present invention provides an optical pickup device, comprising a lead frame package comprising a lead frame in which an opening is formed to communicate with the outside, a two-wavelength light source module arranged in a portion of the opening for emitting two beams having different wavelengths toward an optical disc, a hologram optical element arranged over the two-wavelength light source module, the hologram optical element comprising a hologram pattern formed in its top for diffracting all beams reflected from the optical disc, and a wavefront-compensation hologram pattern formed on its bottom for transmitting a first one of two beams having different wavelengths and diffracting a second one of them to condense the two beams onto a single point; and a detecting unit comprising a board arranged beneath the lead frame package to be separated from and moved independently of the lead frame package, and a photo detector mounted on said board, wherein the lead frame package constitutes a single module.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 3:
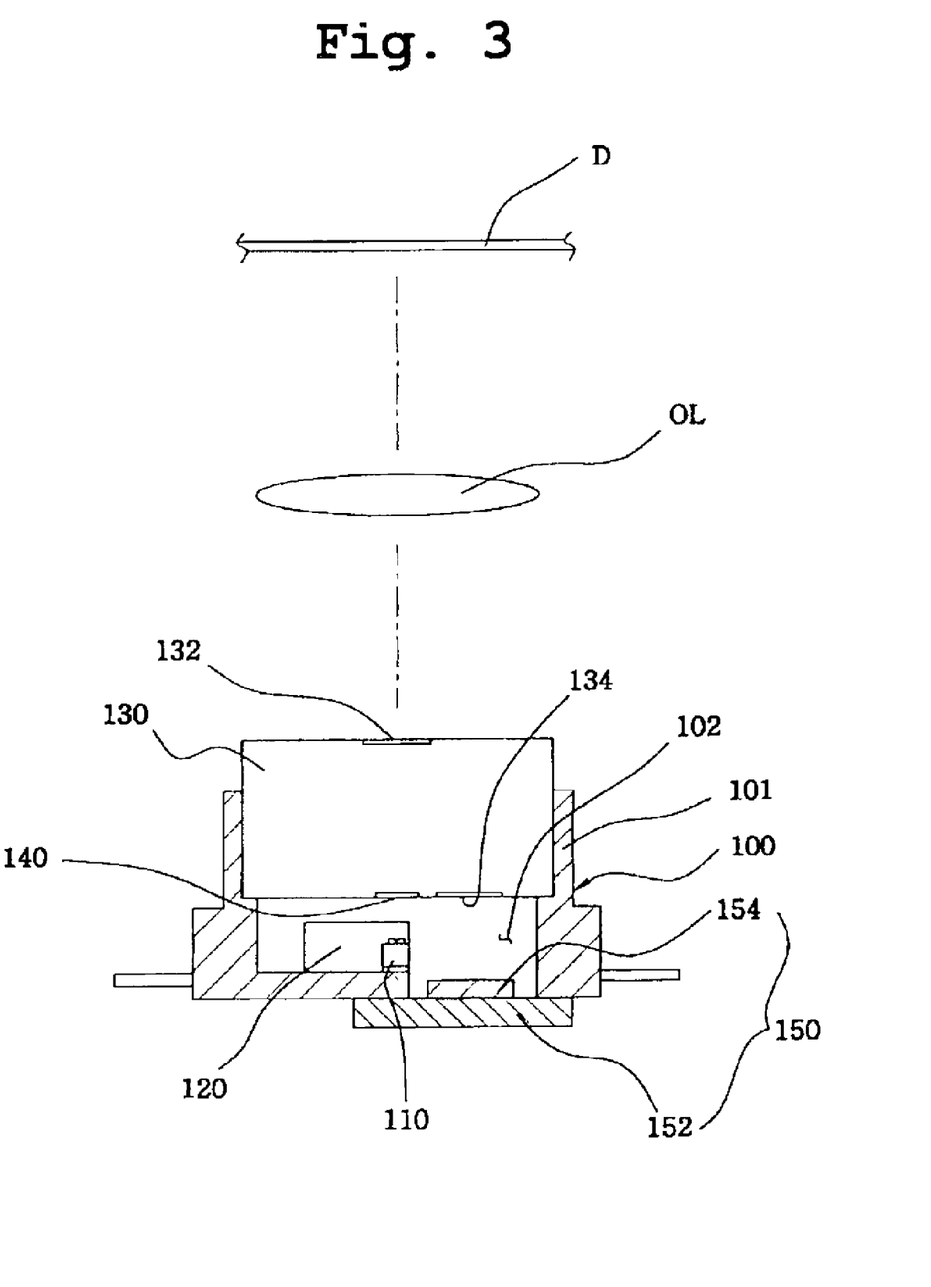
FIG. 3 is a front view of an optical pickup device according to a preferred embodiment of the present invention.
Figure 4:
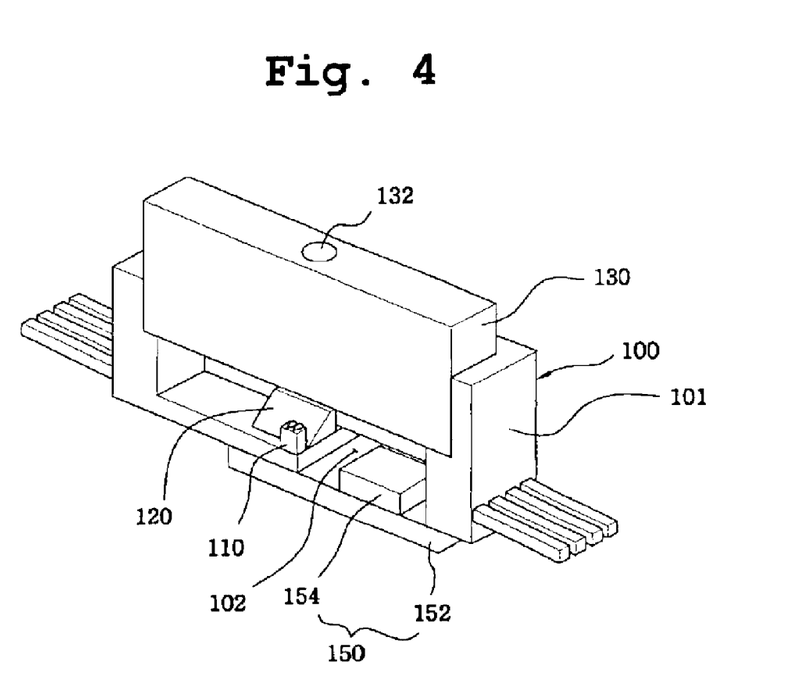
FIG. 4 is a perspective view of a lead frame package in the optical pickup device element in accordance with the present invention.
Figure 5:
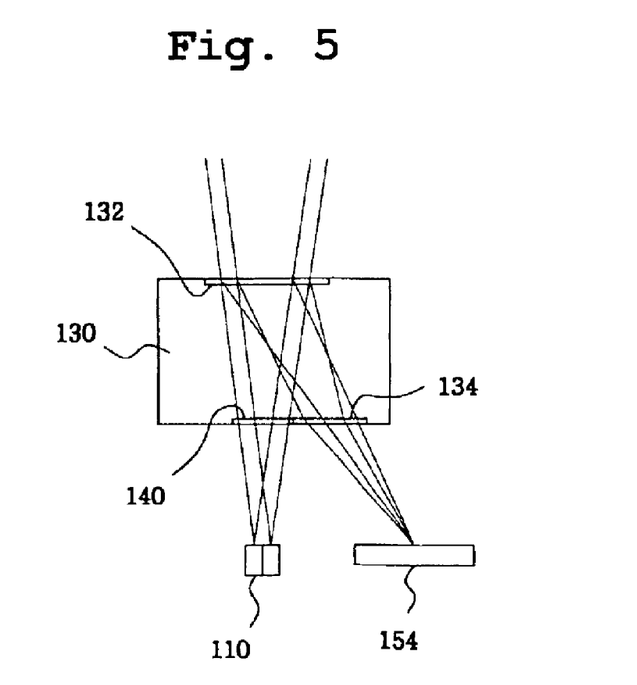
FIG. 5 is a front view showing the construction and light path of a hologram optical element in accordance with the present invention.
Figure 6:
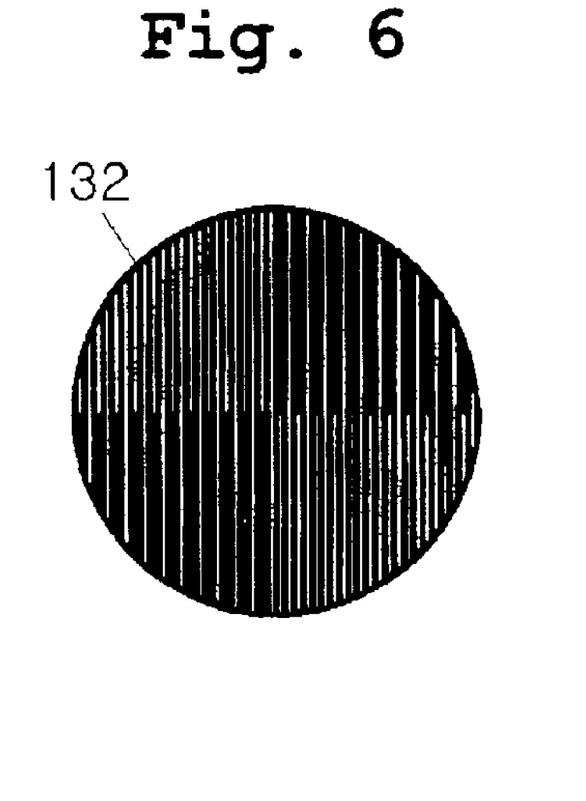
FIG. 6 is a view showing a hologram pattern in the top of the hologram optical element in accordance with the present invention.
Figure 7:
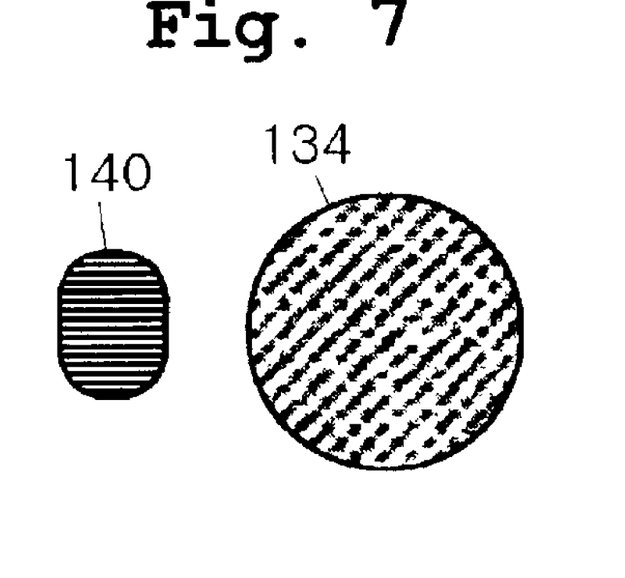
FIG. 7 is a view showing a diffraction grating and a wavefront-compensation hologram pattern in the bottom of the hologram optical element in accordance with the present invention.
Figure 8:
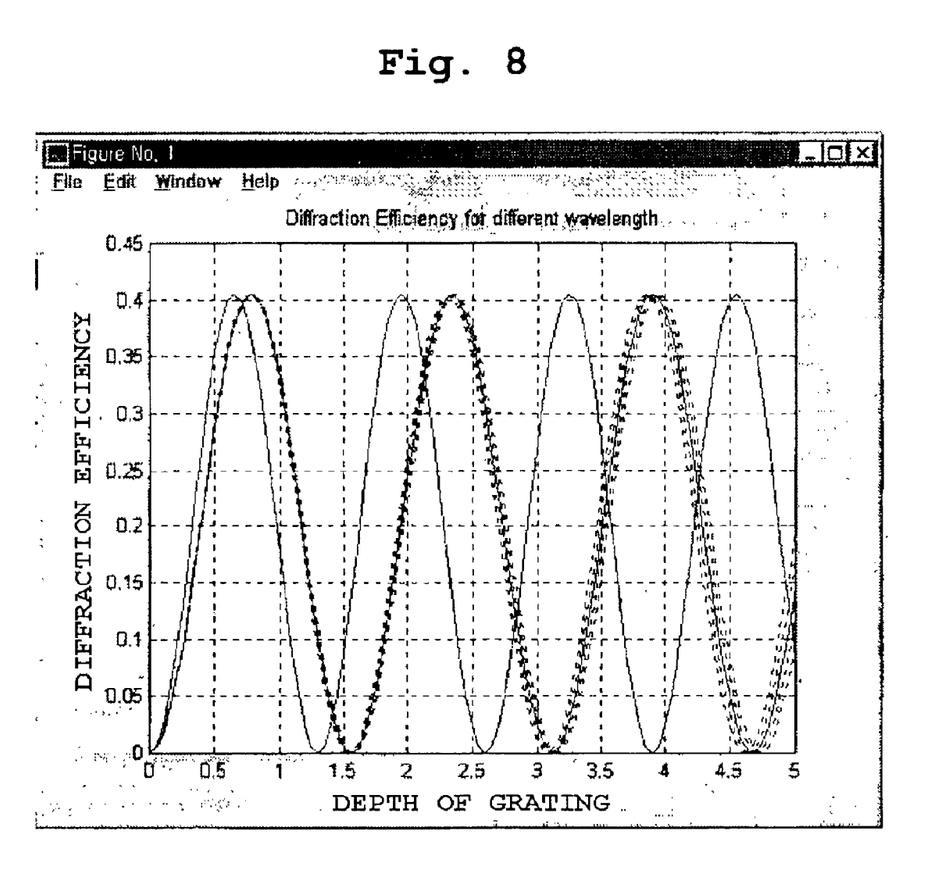
FIG. 8 is a graph showing the relationship between the depth of a grating, the wavelength of a light beam and diffraction efficiency in accordance with the present invention.
Figure 9:
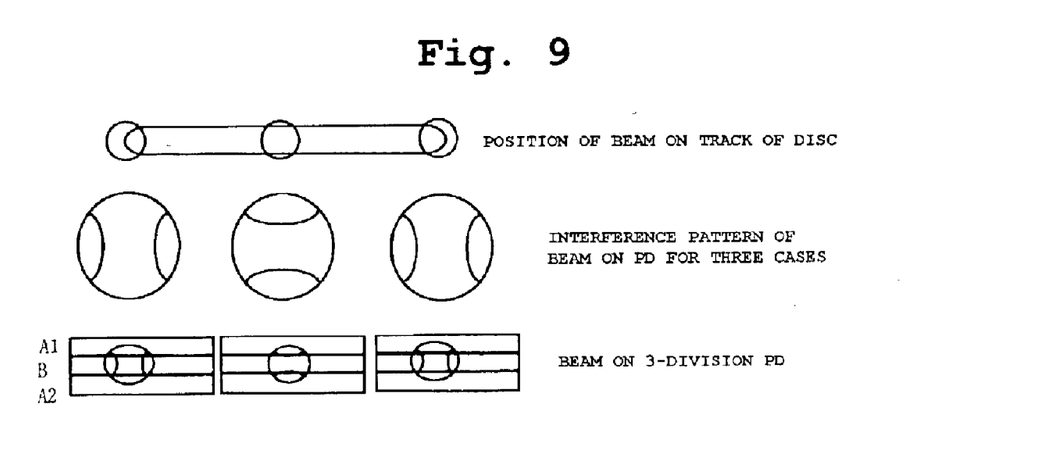
FIG. 9 is a view showing the detection of a tracking error signal using a DPD method.

FIG. 3 is a front view of an optical pickup device according to the present invention, FIG. 4 is a perspective view of a lead frame package of the present invention, FIG. 5 is a front view of a hologram optical element of the present invention, FIG. 6 is a view showing a hologram pattern of the present invention, FIG. 7 is a view showing a diffraction grating and a wavefront-compensation hologram pattern of the present invention, FIG. 8 is a graph showing the relationship between the depth of a grating, the wavelength of a light beam and diffraction efficiency, and FIG. 9 is a view showing the detection of a tracking error signal using a DPD method.

Referring to FIGS. 3 to 7, in the optical pickup device of the present invention, a two-wavelength light source module 110, a mirror 120, a diffraction grating 140 and a hologram optical element 130 are arranged within a single independent lead frame 101 to constitute a single module or a lead frame package 100.

An opening 102 is formed within the lead frame 101 and is defined by the hologram optical element 130, the bottom of the lead frame 101 and sidewalls of the lead frame 101. That is, the top of the opening 102 is sealed with the hologram optical element 130, and the bottom of the opening 102 communicates with the outside through a portion of the bottom of the lead frame 101.

On the bottom of the lead frame 101 is mounted the two-wavelength light source module 110 to selectively emit beams with two different wavelengths of 650 nm for a DVD and 780 nm for a CD. The beams emitted from the two-wavelength light source module 110 are directed to the optical disc D by the mirror 120.

Preferably, the mirror 120 is arranged at an angle of 45 degrees with respect to an axis of light beams emitted from the two-wavelength light source module 110 so as to direct beams toward the optical disc D.

Properly, it is possible to design the optical pickup device such that the light beams emitted from the two-wavelength light source module 110 are directed to the optical disc D directly, without the use of the mirror 120.

The hologram optical element 130 is arranged over the mirror 120 and fixed to the lead frame 101.

The hologram optical element 130 has a transmission diffraction grating 140 arranged on the center of the bottom thereof so as to divide each beam into at least three beams including 0th beam and ±1th beams when the beams reflected by the mirror 120 are transmitted.

Further, a hologram pattern 132 to diffract all beams having wavelengths of 650 nm and 780 nm, which are reflected from the optical disc D, in a single direction is formed in the top of the hologram optical element 130. On the other hand, a wavefront-compensation hologram pattern 134 is formed in a portion of the bottom of the hologram optical element 130 while being spaced apart from the diffraction grating 140.

The wavefront-compensation hologram pattern 134 has a pattern enabling transmission of one of the two beams diffracted from the top of the hologram optical element 130, and diffraction of the other. That is, the wavefront-compensation hologram pattern 134 can be designed to transmit a beam having a wavelength of 650 nm, and diffract a beam having a wavelength of 780 nm, so that the beams may be condensed on a single point of the photo detector 154 described later. Contrary to this, the hologram pattern 134 can be designed to transmit a beam having a wavelength of 780 nm, and diffract a beam having a wavelength of 650 nm.

In this case, the wavefront-compensation hologram pattern 134 has a periodic thin phase grating. Further, the intensity of a diffraction beam by the grating (diffraction efficiency) is provided by the following Equation [1].

$$A_0 = [(2q-1)\sin\theta]^2 + \cos^2\theta$$
$$A_1 = [2(\sin(m\pi q)/m\pi)\sin\theta]^2 \quad [1]$$

Equation [1] represents a shape of light focused on a far screen after passing through a hologram pattern of a grating shape, or a grating. Equation [1] is called Fourier Transform, where m is a diffraction order, and q is a duty cycle of a grating.

Further, the relationship among the depth of a grating, the wavelength of a light beam and diffraction efficiency is represented by the graph shown in FIG. 8.

In the graph, if a hologram is produced by using the depth of a grating at a position where the intensities of diffraction efficiency for respective wavelengths of 650 nm and 780 nm are contrary to each other, only a beam having one wavelength is diffracted, and another beam having the other does not have its efficiency decreased.

It is preferable to form both the wavefront-compensation hologram pattern 134 and the transmission diffraction grating 140 to be integrated onto the bottom of the hologram optical element 130. However, the wavefront-compensation hologram pattern 134 and the transmission diffraction grating 140 can be separately produced and attached to the bottom of the hologram optical element 130.

The hologram optical element 130 with these patterns is constructed not to influence beams when the beams emitted from the two-wavelength light source module 110 are transmitted.

An object lens OL to condense beams transmitted through the hologram optical element 130 onto a single point of the optical disc D is arranged over the lead frame package 100 forming a single module, while being spaced apart from the lead frame package 100.

Further, a detecting unit 150 having the photo detector 154 to detect beams, which are reflected from the optical disc D and diffracted from the hologram optical element 130, is arranged at a portion beneath the lead frame package 100. In this case, the detecting unit 150 can be separated from and moved independently of the lead frame package 100.

That is, the detecting unit 150 is comprised of a board 152 installed to be separated from and moved independently of the lead frame package 100, and the photo detector 154 mounted on the board 152.

A typical chip-on-board photo diode package or a flip-chip package can be used as the detecting unit 150.

In this case, a typical differential phase detection (DPD) method can be utilized so as to detect a tracking error signal of the detecting unit 150. Here, the tracking error signal is detected by (A1+A2)−(B) in FIG. 9.

The DPD method is a typical method to evaluate and use an interference pattern of light reflected and diffracted from an optical disc. That is, as shown in FIG. 9, a pattern of a baseball shape is formed on a beam, wherein right and left side portions of a circle are varied according to a track position. Therefore, the right and left side portions of a circle are evaluated to detect the tracking error signal. Generally, a 4-division photo diode (PD) is used in the prior art, while two 3-division PDs are used in the present invention.

The photo detector 154 detects condensed beams to convert an RF signal, a focus error signal, a tracking error signal and optical disc information into electrical signals. The converted electrical signals are demodulated and reproduced into original signals by a control circuit (not shown).

Hereinafter, the operation and effect of the optical pickup device of the present invention having the above construction is described in detail.

First, a light path is described as follows: Each beam selectively emitted from the two-wavelength light source module 110 is reflected on the mirror 120 to pass through the hologram optical element 130, and is condensed onto a point of the optical disc D through the object lens OL.

Each beam reflected from the optical disc D passes through the object lens OL and is inputted to the hologram optical element 130. The inputted beam is bent while passing through the hologram optical element 130, and then condensed onto a point of the photo detector 154.

That is, each beam reflected from the optical disc D is bent to be offset at a predetermined angle with respect to an axis of beams emitted from the two-wavelength light source module 110 while passing through the hologram pattern 132 in the top of the hologram optical element 130. Then, one beam is transmitted without being influenced and the other beam is bent, while passing through the hologram pattern 134 in the bottom of the hologram optical element 130, thus enabling two beams to be condensed onto a single point of the photo detector 154.

Then, the photo detector 154 detects the condensed beams to convert the RF signal, the focus error signal, the tracking error signal and the optical disc information into electric signals.

As describe above, the optical pickup device of the present invention is constructed to condense two selectively emitted light beams onto a single point using one hologram. Therefore, there is no need to develop a photo detector having a new pattern suitable for the two-wavelength light source module. Moreover, the photo detector, which is widely used in the prior art, can still be used in the present invention, thus saving the development costs of the optical pickup device.

Further, the top surface of the hologram optical element is not divided into several pieces, differently from a conventional optical element, so dispersion noise generated when the hologram is divided into several pieces does not occur, and consequently, optical efficiency is improved.

Further, the present invention can reduce the number of optical parts such as a beam splitter, a prism and a sensor lens used in the conventional optical pickup device, thus simplifying construction and reducing the cost of optical pickup devices. Further, the present invention can achieve miniaturization and slimness of an optical pickup device because the two-wavelength light source module, the mirror and the hologram optical element are integrated within the lead frame package. Especially, since the two-wavelength light source module is applied to the lead frame package, the application areas and utilization of the optical pickup device become more diverse. That is, it is possible to achieve miniaturization and slimness in an optical pickup device employing the two-wavelength light source module.

Further, even though beams emitted from the light source module do not arrive at an exact position of the photo detector due to a tolerance generated while the beams pass through the hologram optical element, the object lens and the optical disc, a desired shape of light beam and desired signals (focus error signal, tracking error signal, RF signal, etc.) can be obtained by adjusting the position of the photo detector because the photo detector is mounted on a board to be movably arranged in the bottom of the lead frame package.

As described above, beams arrive at an exact position of the photo detector, without an error generated by the tolerance. Therefore, the optical pickup device of the present invention is advantageous in that it does not require expensive equipment used in the prior art to precisely adjust the position of the photo detector, thereby reducing the production cost of the optical pickup device, and enabling the position of the photo detector to be easily adjusted.

Figure 10:
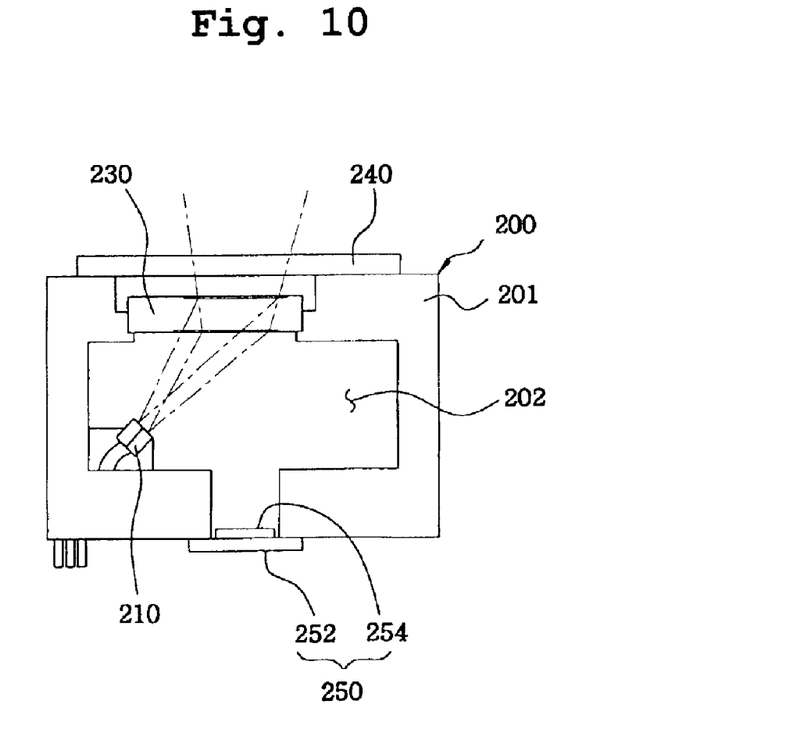
FIG. 10 is a front view of another optical pickup device according to another preferred embodiment of the present invention.

Meanwhile, FIG. 10 shows another optical pickup device according to another preferred embodiment of the present invention.

Compared with the optical pickup device of FIG. 3, the optical pickup device of FIG. 10 has the same operation and effect, but is different only in the construction of its lead frame package.

The construction of a lead frame package different from that of FIG. 3 is described. An opening 202 is formed within a lead frame 201 and a two-wavelength light source module 210 to emit two beams having different wavelengths to be inclined is arranged at a portion of the opening 202, and a hologram optical element 230 is arranged over the two-wavelength light source module 210, thus constituting a single module.

Further, a wavefront-compensation hologram pattern to diffract one of two beams emitted from the two-waveform light source module 210 toward an optical disc D and transmit the other is formed in the bottom of the hologram optical element 230. Further, a hologram pattern to diffract beams transmitted from the bottom of the hologram optical element 230 toward the optical disc D is formed in the top of the hologram optical element 230.

Further, a diffraction grating 240 to divide each beam emitted from the two-wavelength light source module 210 into a main beam and a sub beam which are inputted to the optical disc D is mounted on the top of the lead frame package 200.

A detecting unit 250 is arranged at the center beneath the lead frame package 200, wherein the detecting unit 250 is comprised of a board 252 installed to be moved independently of the lead frame package 200 and a photo detector 254 mounted on the top of the board 252.

Meanwhile, the hologram optical element 230 of the present invention can be applied to all optical pickup devices which condense each beam emitted from a two-wavelength light source module onto a single point of a photo detector using a hologram.

Further, the optical pickup device constructed by the present invention is used in various kinds of optical disc recording and reproducing apparatuses.

As described above, the present invention provides an optical pickup device, which can increase application areas and utilities of optical pickup devices and achieve miniaturization and slimness of optical pickup devices employing a two-wavelength light source module by applying a two-wavelength light source module to a lead frame package.

Further, the present invention is advantageous in that it achieves miniaturization and slimness of optical pickup devices by integrating a plurality of optical parts into a single module using a lead frame package, improves optical efficiency by using a hologram constructed to prevent dispersion noise from occurring, and reduces the cost of optical pickup devices by reducing the number of optical parts and continuing to use a conventional photo detector.

Moreover, the present invention is advantageous in that it can easily adjust the position of a photo detector by movably arranging a die and save production costs and improve the productivity of optical pickup devices because it does not use expensive equipment for precisely adjusting the position of the photo detector.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup device, comprising:
    a lead frame package comprising,
        a lead frame in which an opening is formed to communicate with the outside,
        a two-wavelength light source module arranged in a portion of the opening for emitting two beams having different wavelengths toward an optical disc, and
        a hologram optical element arranged over the two-wavelength light source module, the hologram optical element comprising a hologram pattern formed in its top for diffracting all beams reflected from the optical disc, and a wavefront-compensation hologram pattern formed on its bottom for transmitting a first one of two beams having different wavelengths and diffracting a second one of them to condense the two beams onto a single point; and
    a detecting unit comprising a board arranged beneath the lead frame package to be separated from and moved independently of the lead frame package, and a photo detector mounted on said board,
    wherein the lead frame package constitutes a single module.

2. The optical pickup device according to claim 1, wherein the beam transmitted by the wavefront-compensation hologram pattern has a wavelength of 650 nm, while the beam diffracted by the wavefront-compensation hologram pattern has a wavelength of 780 nm, when beams pass through the wavefront-compensation hologram pattern.

3. The optical pickup device according to claim 1, wherein the beam transmitted by the wavefront-compensation hologram pattern has a wavelength of 780 nm, while the beam diffracted by the wavefront-compensation hologram pattern has a wavelength of 650 nm, when beams pass through the wavefront-compensation hologram pattern.

4. The optical pickup device according to claim 1, wherein the wavefront-compensation hologram pattern is designed such that intensity of a diffraction beam of its grating is provided by following equations:

$$A_0 = [(2q-1)\sin\theta]^2 + \cos^2\theta$$

$$A_1 = [2(\sin(m\pi q)/m\pi)\sin\theta]^2.$$

5. The optical pickup device according to claim 2, wherein the wavefront-compensation hologram pattern is designed such that intensity of a diffraction beam of its grating is provided by following equations:

$$A_0 = [(2q-1)\sin\theta]^2 + \cos^2\theta$$

$$A_1 = [2(\sin(m\pi q)/m\pi)\sin\theta]^2.$$

6. The optical pickup device according to claim 3, wherein the wavefront-compensation hologram pattern is designed such that intensity of a diffraction beam of its grating is provided by following equations:

$$A_0 = [(2q-1)\sin\theta]^2 + \cos^2\theta$$

$$A_1 [2(\sin(m\pi q)/m\pi)\sin\theta]^2.$$

7. The optical pickup device according to claim 1, wherein the detecting unit is a chip-on-board photo diode package.

8. The optical pickup device according to claim 1, wherein the detecting unit is a flip-chip package.

9. The optical pickup device according to claim 1, wherein the hologram optical element includes a diffraction grating formed on its bottom for dividing each beam emitted from the two-wavelength light source module into a main beam and a sub beam which are inputted to the optical disc.

10. The optical pickup device according to claim 1, further comprising an object lens arranged on a light path over the lead frame package for condensing beams onto a single point of the optical disc.

11. The optical pickup device according to claim 1, wherein the two-wavelength light source module is arranged to emit beams in a direction perpendicular to the optical disc, and a mirror for reflecting beams emitted from the two-wavelength light source module toward the optical disc is formed within the lead frame package.

12. An optical pickup device, comprising:
a lead frame package comprising,
  a lead frame in which an opening is formed to communicate with the outside,
  a two-wavelength light source module arranged in a portion of the opening for emitting two beams having different wavelengths toward an optical disc, and
  a hologram optical element arranged over the two-wavelength light source module, the hologram optical element comprising a hologram pattern formed in its top for diffracting all beams reflected from the optical disc, a diffraction grating formed on its bottom for dividing each beam emitted from the two-wavelength light source module into a main beam and a sub beam, and a wavefront-compensation hologram pattern formed on its bottom for transmitting a first one of two beams diffracted from the top of the hologram optical element and diffracting a second one;
an object lens arranged on a light path over the lead frame package for condensing beams onto a single point of the optical disc; and
a detecting unit comprising a board arranged beneath the lead frame package to be separated from and moved independently of the lead frame package, and a photo detector mounted on said board,
wherein the lead frame package constitutes a single module.

13. An optical pickup device, comprising:
a lead frame package, comprising,
  a lead frame in which an opening is formed to communicate with the outside,
  a two-wavelength light source module arranged in a portion of the opening for emitting two beams having different wavelengths to be inclined, and
  a hologram optical element arranged over the two-wavelength light source module, the hologram optical element comprising a wavefront-compensation hologram pattern formed on its bottom for diffracting a first one of beams emitted from the two-wavelength light source forward an optical disc and transmitting a second one, and a hologram pattern formed in its top for diffracting beams transmitted from the bottom of the hologram optical element forward the optical disc, constitute a single module; and
a detecting unit comprising a board arranged beneath the lead frame package to be separated from and moved independently of the lead frame package, and a photo detector mounted on said board,
wherein the lead frame package constitutes a single module.

14. The optical pickup device according to claim 13, wherein the beam transmitted by the wavefront-compensation hologram pattern has a wavelength of 650 nm, while the beam diffracted by the wavefront-compensation hologram pattern has a wavelength of 780 nm, when beams pass through the wavefront-compensation hologram pattern.

15. The optical pickup device according to claim 13, wherein the beam transmitted by the wavefront-compensation hologram pattern has a wavelength of 780 nm, while the beam diffracted by the wavefront-compensation hologram pattern has a wavelength of 650 nm, when beams pass through the wavefront-compensation hologram pattern.

16. The optical pickup device according to claim 13, wherein the wavefront-compensation hologram pattern is designed such that intensity of a diffraction beam of its grating is provided by following equations:

$$A_0 = [(2q-1)\sin\theta]^2 + \cos^2\theta$$

$$A_1 = [2(\sin(m\pi q)/m\pi)\sin\theta]^2.$$

17. The optical pickup device according to claim 14, wherein the wavefront-compensation hologram pattern is designed such that intensity of a diffraction beam of its grating is provided by following equations:

$$A_0 = [(2q-1)\sin\theta]^2 + \cos^2\theta$$

$$A_1 = [2(\sin(m\pi)/m\pi)\sin\theta]^2.$$

18. The optical pickup device according to claim 15, wherein the wavefront-compensation hologram pattern is designed such that intensity of a diffraction beam of its grating is provided by following equations:

$$A_0 = [(2q-1)\sin\theta]^2 + \cos^2\theta$$

$$A_1 = [2(\sin(m\pi q)/m\pi)\sin\theta]^2.$$

19. The optical pickup device according to claim 13, wherein the detecting unit is a chip-on-board photo diode package.

20. The optical pickup device according to claim 13, wherein the detecting unit is a flip-chip package.

21. The optical pickup device according to claim 13, further comprising a diffraction grating mounted on the top of the lead frame package for dividing each beam emitted from the two-wavelength light source module into a main beam and a sub beam which are inputted to the optical disc.

22. An optical pickup device employing a two-wavelength light source module for emitting beams having different wavelengths and a hologram optical element, wherein:
  a hologram pattern for diffracting two inputted beams is formed in an incident surface of the hologram optical element, while a wavefront-compensation hologram pattern for transmitting a first one of two beams having different wavelengths and diffracting a second one to condense two beams onto a single point is formed on a discharge surface of the hologram optical element.

* * * * *